United States Patent [19]

Yamamoto et al.

[11] Patent Number: 4,557,948
[45] Date of Patent: Dec. 10, 1985

[54] PROCESS FOR PRODUCING MAGNETIC RECORDING MATERIALS

[75] Inventors: Nobuyuki Yamamoto, Kanagawa; Masao Yabe, Shizuoka; Yasuo Nishikawa, Kanagawa; Akio Yanai, Kanagawa; Ryuji Shirahata, Kanagawa; Kyoichi Naruo, Kanagawa, all of Japan

[73] Assignee: Fuji Photo Film Co., Ltd., Kanagawa, Japan

[21] Appl. No.: 637,703

[22] Filed: Aug. 6, 1984

Related U.S. Application Data

[63] Continuation of Ser. No. 493,880, May 12, 1983, abandoned.

[30] Foreign Application Priority Data

May 12, 1982 [JP] Japan ................................. 57-80600

[51] Int. Cl.$^4$ ..................... H01F 10/02; B05D 5/12
[52] U.S. Cl. ............................... 427/131; 427/127; 427/130; 427/132
[58] Field of Search ............................. 427/127–132

[56] References Cited

U.S. PATENT DOCUMENTS 3,466,156  9/1969  Peters et al. ...................... 29/195
3,719,525  3/1973  Patel et al. ....................... 117/237
3,993,824  11/1976  Shirahata et al. ................. 428/216

Primary Examiner—Bernard D. Pianalto
Attorney, Agent, or Firm—Sughrue, Mion, Zinn, Macpeak & Seas

[57] ABSTRACT

A process for producing a magnetic recording material comprising a support having a thin metal film layer provided thereon is described, the process comprising the steps of (1) coating a thin magnetic metal film having a water contact angle of at least 25° with a polymer solution to form a thin polymer layer, drying the thin polymer layer, and providing a lubricant on the thin polymer layer, or (2) coating the thin magnetic metal film with a lubricant-containing polymer solution to form a lubricant-containing polymer layer, and drying the lubricant-containing polymer layer.

11 Claims, No Drawings

PROCESS FOR PRODUCING MAGNETIC RECORDING MATERIALS

This application is a continuation of application Ser. No. 493,880, filed May 12, 1983, now abandoned.

FIELD OF THE INVENTION

The present invention relates to a process for producing magnetic recording materials having a thin magnetic metal film layer as a magnetic recording layer, and more particularly, to a process for producing thin metal film type magnetic recording materials having excellent running properties and abrasion resistance.

BACKGROUND OF THE INVENTION

Presently used magnetic recording materials include magnetic oxide powder and ferromagnetic alloy powder, such as $\gamma$-Fe$_2$O$_3$, Co-doped $\gamma$-Fe$_2$O$_3$, Fe$_3$O$_4$, Co-doped Fe$_3$O$_4$, a Berthollide compound of $\gamma$-Fe$_2$O$_3$ and Fe$_3$O$_4$, and CrO$_2$. These powders are dispersed in an organic binder, e.g., a vinyl chloride/vinyl acetate copolymer, styrene/butadiene copolymer, an epoxy resin, or a polyurethane resin, and coated on a non-magnetic support. In recent years there has been increasing demand for high density recording. Accordingly, there has been increased demand for so-called thin metal film type magnetic recording materials with a thin ferromagnetic metal film as a magnetic recording layer. These thin ferromagnetic metal films are produced by vapor deposition methods such as vacuum deposition, sputtering, or ion plating, or plating methods such as electroplating or non-electroplating. Thus, extensive studies have been made on such thin metal film type magnetic recording materials in order to put them to practical use.

Since conventional coating type magnetic recording materials mainly employ metal oxides of low saturation magnetization as magnetic substances, the reduction in thickness of the magnetic recording material (this reduction in thickness being necessary for high density recording) lowers the signal output. For this reason, coating type magnetic recording materials suffer from limitations with respect to high density recording. On the other hand, the thin metal film type recording materials are desirable because ferromagnetic metals of greater saturation magnetization than the metal oxides can be formed into a very thin film without interposing therebetween a non-magnetic substance, such as a binder.

These thin metal film type magnetic recording materials, however, suffer from serious problems as described hereinafter. That is, since the magnetic recording materials are brought into a relative movement while contacting with magnetic heads and guide poles during the processes of recording, reproducing, and erasing magnetic signals, they are worn out or broken by contact with the magnetic heads and guide poles. For example, when they are placed in a sliding contact condition with the magnetic heads and guide poles, the magnetic recording layer may be easily scraped away, since the magnetic recording layer does not contain material such as binder.

In order to overcome the above problem, an attempt has been made to coat the magnetic recording layer with, for example, a polymer film having a thickness of about 0.2 $\mu$m. This method, however, is not desirable in that the overcoating causes a spacing loss which causes output drop in high density recording.

It is also known that the coating of a lubricant on the surface of the magnetic recording layer in a thin layer form reduces the coefficient of friction between the thin metal film and the magnetic head or guide pole, and improves the running properties, whereby the resulting magnetic recording material is scratched only with difficulty. In this case, however, the effects obtained by coating such lubricants do not last for a long period of time, and, when the magnetic recording material is used repeatedly, the coefficient of friction increases abruptly, resulting in a break-down of the magnetic recording layer.

Another method of overcoming the above problem is to form a lubricant protective layer of, for example, metal or metal oxide on the surface of the magnetic recording material, as disclosed in Japanese Patent Application (OPI) Nos. 39708/78 and 40505/78 (the term "OPI" as used herein means a "published unexamined Japanese patent application". However, the effects obtained by forming the lubricant protective layer also do not last for a long period of time, and, when the magnetic recording material is used repeatedly, the coefficient of friction increaes abruptly, resulting in a break-down of the magnetic recording layer.

SUMMARY OF THE INVENTION

An object of the invention is to provide a thin metal film type magnetic recording material having excellent running properties and abrasion resistance.

Another object of the invention is to provide a thin metal film type magnetic recording material in which the effects of improving the running properties and abrasion resistance last for long periods of time.

It has been found that these objects can be attained by a process comprising the steps of:

(1) coating a thin magnetic metal layer having a water contact angle of at least 25° provided on a support with a polymer solution to form a thin polymer layer on the thin magnetic metal layer, drying the thin polymer layer and, thereafter, providing a lubricant on the thin polymer layer; or (2) coating a thin magnetic metal layer having a water contact angle of at least 25° with a lubricant-containing polymer solution to form a thin lubricant-containing polymer layer on the thin magnetic metal layer, and drying the lubricant-containing polymer layer.

DETAILED DESCRIPTION OF THE INVENTION

The term "contact angle of the surface to water" as used herein means the contact angle of water droplet to the surface of the metal film. The theoretical maximum contact angle is 180° where the water droplet is contact with the surface in a true spherical form. The relationship between the contact angle and the smoothness of surface is reported by R. W. Wenzel, Ind. Eng. Chem., 28, 988 (1936). In the present invention, 0.6 $\mu$l ( of water droplet is used and the contact angle is determined using a contact angle measurement device produced by Erma Kogaku Co.

Thin magnetic metal films as used herein are preferably those in which the contact angle of the surface to water is at least 25° more preferably at least 35°. (The contact angle is hereinafter referred to "water contact angle".) These thin magnetic metal films can be produced by forming a thin film of magnetic metal or alloy on a strip-like non-magnetic support by a vapor deposition or plating method, winding the resulting member comprising the support with the thin metal film provided thereon into a roll, taking out the member into the air, and allowing it to stand at a temperature of at least 0° C., preferably from 10° to 80° C. for at least 24 hours, preferably more than 48 hours, more preferably more than 120 hours. The atmosphere in which the member is allowed to stand may be air, oxygen, or nitrogen, preferably air or oxygen. The exposure of the metal layer to air or oxygen appears to increase the water contact angle due to oxidation. After the formation of the thin magnetic metal film, corona discharge, irradiation of electron rays or ultraviolet rays, ozone oxidation, and so forth may be applied.

The term "vapor deposition method" as used herein refers to a process in which a substance or compound to be deposited is transformed into a vapor or ionized vapor and deposited on a substrate in a gas or vacuum. This process includes vacuum deposition, sputtering, ion plating, and chemical vapor deposition.

Conditions under which the vapor deposition method is performed vary greatly with the type of method and the type of the substance to be deposited, and significant differences are shown in Table 1.

TABLE 1

|  | Vacuum Deposition | Sputtering | Ion Plating | Ion Beam Deposition | Chemical Vapor Deposition |
| --- | --- | --- | --- | --- | --- |
| Pressure of Atmosphere (Torr) | $<10^{-5}$ | $10^{-2}$ to $10^{-3}$ (Ar) | $10^{-2}$ to $10^{-3}$ (Ar) | $10^{-5}$ to $10^{-6}$ | $<1$ atm (Ar) |
| Temperature of Material | evaporation temperature | cooling with water | evaporation temperature | — | evaporation temperature |
| Film Thickness | up to about 10 μm | up to about 100 μm | up to about 100 μm | up to about 10 μm | up to about 1,000 μm |
| Deposition Rate Å/sec | up to about 1,000 | up to about 1,000 | up to about 1,000 | about 100 to 3,000 | 100 |
| Voltage Applied | — | about 10 to 1,000 V | about 100 V 10 kV (glow discharge) | up to 500 V | — |

Ferromagnetic metals and alloys which can be used in the formation of thin magnetic metal films as a magnetic recording layer in the present invention include ferromagnetic metals such as iron, cobalt and nickel, and ferromagnetic alloys composed of at least one element of Fe, Co and Ni such as Fe-Co, Fe-Ni, Co-Ni, Fe-Si, Fe-Rh, Co-P, Co-B, Co-Si, Co-V, Co-Y, Co-La, Co-Ce, Co-Pr, Co-Sm, Co-Pt, Co-Mn, Fe-Co-Ni, Co-Ni-P, Co-Ni-B, Co-Ni-Ag, Co-Ni-Na, Co-Ni-Ce, Co-Ni-Zn, Co-Ni-Cu, Co-Ni-W, Co-Ni-Re, and Co-Sm-Cu. These ferromagnetic metals or alloys are provided in a thin film layer by the vapor deposition or plating method. The thickness of the thin film is from 0.02 to 5 μm and preferably from 0.05 to 1.0 μm.

Polymers which can be provided on the thin magnetic metal film having a water contact angle of at least 25° in a layer form according to the present invention include thermoplastic resins, thermosetting or reactive resins, and their mixtures. Preferred polymers are thermoplastic resins.

Thermoplastic resins which can be used include those resins having a softening temperature of 150° C. or less, an average molecular weight of from 10,000 to 200,000, and a degree of polymerization of from about 200 to about 2,000. Examples of such resins include a vinyl chloride/vinyl acetate copolymer, a vinyl chloride/vinylidene chloride copolymer, a vinyl chloride/acrylonitrile copolymer, an acrylic acid ester/acrylonitrile copolymer, an acrylic acid ester/vinylidene chloride copolymer, an acrylic acid ester/styrene copolymer, a methacrylic acid ester/acrylonitrile copolymer, a methacrylic acid ester/vinylidene chloride copolymer, a methacrylic acid ester/styrene copolymer, an urethane elastomer, polyvinyl fluoride, a vinylidene chloride/acrylonitrile copolymer, a butadiene/acrylonitrile copolymer, a polyamide resin, polyvinyl butyral, cellulose derivatives (e.g., cellulose acetate butyrate, cellulose diacetate, cellulose triacetate, cellulose propionate, and nitrocellulose), a styrene/butadiene copolymer, a polyester resin, and various synthetic rubber-like thermoplastic resins (e.g., polybutadiene, polychloroprene, polyisoprene, and a styrene/butadiene copolymer). These resins can be used alone or in combination with each other. Such resins are described in Japanese Patent Publication Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72 and 27886/73 and U.S. Pat. Nos. 3,144,352, 3,419,420, 3,499,789, and 3,713,887.

Thermosetting or reactive resins which can be used include those resins which have an average molecular weight of 200,000 or less when present in a coating solution, and which when coated and dried, produce a limitless molecular weight through reactions such as condensation and addition. Of these resins, those resins are preferred which do not soften or melt until they are heat-decomposed. Suitable examples of the thermosetting or reactive resins include phenol/formalin novolak resin, a phenol/formalin resol resin, a phenol/furfural resin, a xylene/formaldehyde resin, a urea resin, a melamine resin, a dry oil-modified alkyd resin, a phenol resin-modified alkyd resins, a maleic acid resin-modified alkyd resin, an unsaturated polyester resin, a combination of an epoxy resin and a hardener (e.g., polyamine, an acid anhydride, a polyamide resin, etc.), a moisture-curable isocyanate terminated polyester resin, a moisture-curable isocyanate terminated polyether resin, polyisocyanate prepolymers (compounds prepared from a diisocyanate and a low molecular weight triol and containing at least three isocyanate groups in the molecule, and trimers and tetramers of diisocyanates), a combination of a polyisocyanate prepolymer and an active hydrogen-containing resin (e.g., polyesterpolyol, polyetherpolyol, an acrylic acid copolymer, a maleic acid copolymer, a 2-hydroxyethyl methacrylate copolymer, a para-hydroxystyrene copolymer, and the like), and mixtures thereof.

Such resins are described in Japanese Patent Publication Nos. 8103/64, 9779/65, 7192/66, 8016/66, 14275/66, 18179/67, 12081/68, 28023/69, 14501/70, 24902/70, 13103/71, 22065/72, 22066/72, 22067/72, 22072/72, 22073/72, 28045/72, 28048/72, and 28922/72, and U.S. Pat. Nos. 3,144,353, 3,320,090, 3,437,510, 3,597,273, 3,781,210, and 3,781,211.

These polymers can be used alone or in combination with each other.

These polymers are dissolved in organic solvents, coated on the thin magnetic metal film having a water contact angle of at least 25°, and dried by hot air to form the desired polymer layer.

When lubricant-containing polymer solutions are applied, the same procedure as described above can be employed with the exception that lubricants are dissolved in organic solvents in combination with polymers.

The temperature of the hot air for drying can be at least 30° C., preferably at least 50° C., but does not exceed a temperature of 30° C. over the glass transition temperature of the support. It is preferred to apply the hot air for about 1 second to about 10 minutes.

The concentration of the polymer in the coating solution is from 0.05 to 5% by weight. When the lubricant is added to the coating solution, it can be used at a concentration of about 0.01 to about 5 wt % in the coating solution and the mixing ratio of the polymer to lubricant can be about 500:1 to about 1:500 by weight. The coating solution is coated so that the dry film thickness of the resulting polymer layer is from 5 to 1,000 Å, preferably from 10 to 500 Å, and more preferably from 20 to 200 Å.

Lubricants which can be used in the present invention include aliphatic acids, metallic soaps, aliphatic acid amides, aliphatic acid esters, animal and vegetable oils, such as mineral oil and whale oil, silicone oil, electrically conductive fine powders, such as molybdenum disulfide and tungsten disulfide, plastic fine powders, such as polyethylene, polypropylene, an ethylene/vinyl chloride copolymer and polytetrafluoroethylene, α-olefin polymers, unsaturated aliphatic hydrocarbons which are liquid at an ordinary temperature (for example, n-olefins in which a double bond is linked to the terminal carbon atom and which contain about 20 carbon atoms), and fluorocarbons.

Of these lubricants, aliphatic acids having more than 10 carbon atoms, metallic soaps of aliphatic acid having more than 10 carbon atoms, aliphatic acid amides having more than 10 carbon atoms, esters of aliphatic acid having more than 10 carbon atoms, higher alcohols having more than 10 carbon atoms, and mixtures thereof are preferred.

To provide the lubricant on the above-described polymer layer, as well as a method in which the lubricant is dissolved in an organic solvent, coated on the polymer layer, and dried, the above-described vapor deposition method can be used.

The amount of the lubricant used is generally from 2 to 200 mg/m$^2$ and preferably from 5 to 100 mg/m$^2$, calculated as an amount after being dried.

Organic solvents which can be used to dissolve the lubricants and polymers include ketones such as acetone, methyl ethyl ketone, methyl isobutyl ketone, and cyclohexanone, alcohols containing from 1 to 10 carbon atoms such as methanol, ethanol, propanol and butanol, esters such as methyl acetate, ethyl acetate, butyl acetate, ethyl lactate, and glycol acetate monoethyl ether, glycol ethers such as ether, glycol dimethyl ether, glycol monoethyl ether, and dioxane, hydrocarbons such as pentane, hexane, heptane, octane, nonane, and decane, tars (aromatic hydrocarbons) such as benzene, toluene, and xylene, and chlorinated hydrocarbons such as methylene chloride, ethylene chloride, carbon tetrachloride, chloroform, ethylenechlorohydrin, and dichlorobenzene.

If desired, rust-preventing agents as disclosed in Japanese Patent Application (OPI) Nos. 63494/76 and 41204/78, antifungal agents as disclosed in Japanese Patent Application No. 26880/79, etc. may be used along with the lubricants, if desired.

Some of the major advantages of the present invention are given below:

(1) When the magnetic recording material produced according to the present invention is used repeatedly, the increase in the coefficient of dynamic friction is very small; that is, the running properties are excellent, and the abrasion resistance is also greatly improved.

(2) Even under high humidity conditions, the coefficient of dynamic friction is small, and the running properties are excellent.

(3) Even when the thin magnetic metal film or the surface of the support is very smooth, the running properties for repeated use are excellent.

The present invention is further illustrated in greater detail by the following examples and comparative examples, but the present invention is not limited thereto. In these examples, all parts are by weight.

EXAMPLE 1

A magnetic film of cobalt (film thickness, 0.2 μm) was provided on a 20 μm thick polyethylene terephthalate film by oblique vapor deposition to prepare a magnetic tape. As an evaporation source, an electron beam evaporation source was used, and cobalt having a purity of 99.95% was placed therein. The oblique vapor deposition was performed at a degree of vacuum of $5 \times 10^{-5}$ Torr and an angle of incidence of 70°. The thus-produced magnetic tape was wound into a roll, taken out into the air, and allowed to stand under the conditions of 23° C. and 65% relative humidity for 30 days.

The water contact angle of the thin magnetic metal film was found to be 60°. On the thin magnetic metal film, a polymer coating solution having the following composition was coated in a dry film thickness of 100 Å, and dried at 100° C. for 1 minute to obtain a polymer layer.

| Polymer Coating Solution | parts |
| --- | --- |
| Vinyl chloride/vinylidene chloride copolymer (molar ratio: 7/3; degree of polymerization: about 300) | 1.0 |
| Methyl ethyl ketone | 200 |
| Toluene | 200 |

On the above-formed polymer layer, a lubricant coating solution having the following composition was coated in an amount of 10 mg/m$^2$ of the lubricant, and dried at 50° C. for 1 minute. Then, the resulting material was slit to a ½ inch width to obtain a video tape (Sample No. 1).

| Lubricant Coating Solution | parts |
| --- | --- |
| Myristic acid | 1.6 |

| Lubricant Coating Solution | parts |
|---|---|
| Butyl stearate | 0.4 |
| n-Hexane | 400 |

EXAMPLE 2

A Co-Ni alloy (Ni content, 30% by weight) was vapor-deposited on a 12 μm thick polyamide film in a film thickness of 0.3 μm in an oxygen atmosphere of $1.0 \times 10^{-4}$ Torr to produce a magnetic tape having a thin magnetic metal film layer provided thereon.

The magnetic tape was allowed to stand in the air for 7 days in the same manner as in Example 1 to obtain the thin magnetic metal film having a water contact angle of 45°.

On the thin magnetic metal film of the magnetic tape, a polymer coating solution and a lubricant coating solution having the following compositions were coated, and the resulting material was slit in the same manner as in Example 1 to obtain a ½ inch wide video tape (Sample No. 2).

| | parts |
|---|---|
| Polymer Coating Solution | |
| Nitrocellulose (viscosity, RS ½) | 1.5 |
| Methyl ethyl ketone | 400 |
| Lubricant Coating Solution | |
| Stearyl alcohol | 1.0 |
| n-Hexane | 400 |

EXAMPLE 3

An Fe-V alloy (V content, 5% by weight) was vapor-deposited on a 12 μm thick polyethylene terephthalate film in a thickness of 0.25 μm to produce a magnetic tape having a thin magnetic metal film layer provided thereon. In the same manner as in Examples 1 and 2, the magnetic tape was allowed to stand in the air for 5 days to obtain the thin magnetic metal film having a water contact angle of 40°.

On the thin magnetic metal film layer of the magnetic tape, a polymer coating solution having the following composition was coated in the same manner as in Example 1 to provide a polymer layer.

| Polymer Coating Solution | parts |
|---|---|
| Vinyl chloride/vinyl acetate copolymer (copolymerization ratio = 92/8; molecular weight, about 20,000) | 1.0 |
| Methyl ethyl ketone | 400 |

On the polymer layer, a mixture of behenic acid ($C_{21}H_{43}COOH$) and behenic acid amide ($C_{21}H_{43}CONH_2$) (weight ratio: 1/1) was vapor-deposited in an amount of 20 mg/m² to produce a video tape (Sample No. 3).

COMPARATIVE EXAMPLE 1

A ½ inch wide video tape (Sample No. C-1) was produced in the same manner as in Example 1 except that within 2 hours after the magnetic tape was wound into a roll and taken out in the air, the polymer solution was coated (the water contact angle of the thin magnetic metal film was 20° or less).

COMPARATIVE EXAMPLE 2

A ½ inch wide video tape (Sample No. C-2) was produced in the same manner as in Example 2 except that within 2 hours after the magnetic tape was wound into a roll and taken out in the air, the polymer solution was coated (the water contact angle of the thin magnetic metal film was 20° or less).

COMPARATIVE EXAMPLE 3

A ½ inch video tape (Sample No. C-3) was produced in the same manner as in Example 3 except that within 2 hours after the magnetic tape was wound into a roll and taken out in the air, the polymer solution was coated (the water contact angle of the thin magnetic metal film was 20° or less).

Each of the video tapes produced in Examples 1 to 3 and Comparative Examples 1 to 3 was mounted on a VHS type video tape recorder, and the still life under the conditions of 25° C. and 45% relative humidity, the initial coefficient of friction at room temperature, and the coefficient of friction after 200-repeated passes were measured. The results are shown in Table 2 below. The coefficient of friction was indicated in terms of μ value calculated by the following equation:

$$T_2/T_1 = e^{\mu\pi}$$

where $T_1$ is a tape tension at the supply side of the rotary cylinder of VTR, and $T_2$ is a tape tension at the take-up side of the rotary cylinder of VTR.

TABLE 2

| Sample No. | Still Life (min) | Coefficient of Friction | |
|---|---|---|---|
| | | Initial Coefficient of Friction | Coefficient of Friction after 200 passes |
| No. 1 | 50 | 0.24 | 0.25 |
| No. 2 | 45 | 0.25 | 0.25 |
| No. 3 | 60 | 0.24 | 0.24 |
| C-1 | 12 | 0.32 | 0.38 |
| C-2 | 15 | 0.35 | 0.40 |
| C-3 | 9 | 0.33 | 0.36 |

As apparent from the results shown in Table 2, the thin metal film type magnetic recording material produced according to the present invention is greatly improved in the running properties and abrasion resistance, and furthermore, the improved running properties and abrasion resistance last over a long period of time. Thus, the magnetic recording material is of high practical value.

While the invention has been described in detail and with reference to specific embodiments thereof, it will be apparent to one skilled in the art that various changes and modifications can be made therein without departing from the spirit and scope thereof.

What is claimed is:

1. A process for producing a magnetic recording medium which comprises the steps of:
    coating a thin magnetic metal layer having a water contact angle of at least 25° provided on a support with a polymer solution to form a thin polymer layer on said thin magnetic metal layer,
    drying the thin polymer layer, and
    providing a lubricant on the thin polymer layer,
    wherein said lubricant is selected from the group consisting aliphatic acids, metallic soaps, aliphatic acid amides, aliphatic acid esters, higher alcohols, and mixtures thereof and wherein said polymer is a thermoplastic resin.

2. A process for producing a magnetic recording medium which comprises the steps of:

coating a thin magnetic metal layer having a water contact angle of at least 25° with a lubricant-containing polymer solution to form a thin lubricant-containing polymer layer on said thin magnetic metal layer, and drying the lubricant-containing polymer layer, wherein the lubricant is selected from the group consisting of aliphatic acids, metallic soaps, aliphatic acid amides, aliphatic said esters, higher alcohols, and mixtures thereof and wherein said polymer is a thermoplastic resin.

3. A process for producing a magnetic recording medium as claimed in claim 1 or 2, wherein the thin magnetic metal layer has a water contact angle of at least 35°.

4. A process for producing a magnetic recording medium as claimed in claim 1 or 2, wherein said thin magnetic metal layer has a thickness of 0.02 μm to 5 μm.

5. A process for producing a magnetic recording medium as claimed in claim 1 or 2, wherein said lubricant is selected from the group consisting of aliphatic acids having more than 10 carbon atoms, metallic soaps of aliphatic acids having more than 10 carbon atoms, aliphatic acid amides having more than 10 carbon atoms, esters of aliphatic acid having more than 10 carbon atoms, higher alcohols having more than 10 carbon atoms and mixtures thereof.

6. A process for producing a magnetic recording medium as claimed in claim 1, wherein said lubricant is provided by coating a solution of lubricant or vapor deposition of lubricant.

7. A process for producing a magnetic recording medium as claimed in claim 1 or 2, wherein said drying step is carried out with hot air having a temperature of at least 30° C.

8. A process for producing a magnetic recording medium as claimed in claim 1 or 2, wherein said magnetic metal layer comprises iron, nickel, cobalt or an alloy composed of at least one element of Fe, Co and Ni.

9. A process for producing a magnetic recording medium as claimed in claim 1 or 2, wherein said lubricant is present in an amount in the range of 2 to 200 mg/m$^2$ of the thin magnetic metal layer.

10. A process for producing a magnetic recording medium as claimed in claim 1, wherein the thin polymer layer has a dry thickness in the range of 5 to 1,000 Å.

11. A process for producing a magnetic recording medium as claimed in claim 2, wherein the lubricant-containing polymer layer has a dry thickness in the range of 5 to 1,000 Å.

* * * * *